United States Patent
Rawlings

(10) Patent No.: US 11,313,432 B2
(45) Date of Patent: Apr. 26, 2022

(54) HYDRAULIC BUSHING WITH INTERNAL TRAVEL LIMITER

(71) Applicant: The Pullman Company, Milan, OH (US)

(72) Inventor: Scott W. Rawlings, North Ridgeville, OH (US)

(73) Assignee: The Pullman Company, Milan, OH (US)

( * ) Notice: Subject to any disclaimer, the term of this patent is extended or adjusted under 35 U.S.C. 154(b) by 21 days.

(21) Appl. No.: 16/909,203

(22) Filed: Jun. 23, 2020

(65) Prior Publication Data
US 2021/0396295 A1 Dec. 23, 2021

(51) Int. Cl.
*F16F 13/14* (2006.01)
(52) U.S. Cl.
CPC .......... *F16F 13/1409* (2013.01); *F16F 13/14* (2013.01); *F16F 13/1463* (2013.01); *B60G 2204/41062* (2013.01); *F16F 2230/0023* (2013.01)
(58) Field of Classification Search
CPC .... F16F 13/1409; F16F 13/14; F16F 13/1463; F16F 2222/12; F16F 2230/02; F16F 2230/0023; B60G 2204/1062
See application file for complete search history.

(56) References Cited

U.S. PATENT DOCUMENTS

| | | | | |
|---|---|---|---|---|
| 4,667,942 A | * | 5/1987 | Bitschkus | F16F 1/387 267/121 |
| 4,700,934 A | * | 10/1987 | Andra | F16F 13/14 267/141.2 |
| 5,013,012 A | * | 5/1991 | Jouade | F16F 13/1463 267/140.12 |

(Continued)

FOREIGN PATENT DOCUMENTS

| | | |
|---|---|---|
| CN | 207554686 U | 6/2018 |
| CN | 109268441 A * | 1/2019 |

(Continued)

OTHER PUBLICATIONS

International Search Report and Written Opinion regarding International Application No. PCT/US2021/037537, dated Oct. 6, 2021.

*Primary Examiner* — Thomas J Williams

(57) ABSTRACT

A hydraulic bushing assembly comprises an inner tube, a travel limiter surrounding the inner tube, a first intermediate insert, a second intermediate insert spaced apart from the first intermediate insert, and an elastomeric bushing disposed around the inner tube and encapsulating the first intermediate insert and the second intermediate insert. The elastomeric bushing at least partially encapsulates the travel limiter such that a portion of the elastomeric bushing is positioned between the travel limiter and the inner tube. First and second bump stops limit displacement of the travel limiter and define first and second fluid chamber within the elastomeric bushing. A fluid passageway defined by the (Continued)

elastomeric bushing and an outer tube extends between the first and second fluid chambers, wherein relative movement between the inner tube and the outer tube causes fluid transfer between the first fluid chamber and the second fluid chamber.

18 Claims, 4 Drawing Sheets

(56) References Cited

U.S. PATENT DOCUMENTS

| | | | | |
|---|---|---|---|---|
| 5,299,788 | A | * | 4/1994 | Kanda ................... F16F 13/14 |
| | | | | 267/140.12 |
| 5,702,094 | A | * | 12/1997 | McLelland ............. F16F 13/14 |
| | | | | 267/140.12 |
| 10,086,645 | B2 | * | 10/2018 | Liu ..................... B60B 17/0027 |
| 10,563,722 | B2 | * | 2/2020 | Zou .......................... B61F 5/38 |
| 2011/0188790 | A1 | | 8/2011 | Eschweiler et al. |
| 2019/0186586 | A1 | * | 6/2019 | Klettke ............... F16F 13/1481 |
| 2021/0396295 | A1 | * | 12/2021 | Rawlings ............ F16F 13/1463 |

FOREIGN PATENT DOCUMENTS

| | | | | |
|---|---|---|---|---|
| CN | 210397567 U | | 4/2020 | |
| DE | 102017205836 A1 | * | 10/2018 | ............. F16F 13/14 |
| DE | 102017120321 B3 | * | 12/2018 | ............ F16C 33/205 |
| FR | 2819301 A1 | * | 7/2002 | ............. F16F 13/16 |
| GB | 2381846 A | * | 5/2003 | ......... F16F 13/1463 |
| KR | 1020130059645 A | | 6/2013 | |
| WO | WO-2010006597 A1 | * | 1/2010 | ............. F16F 13/14 |
| WO | WO-2021117761 A1 | * | 6/2021 | |

* cited by examiner

HYDRAULIC BUSHING WITH INTERNAL TRAVEL LIMITER

FIELD

The present disclosure relates to a hydraulic bushing. More particularly, the present invention relates to a hydraulic bushing with an integrally molded internal travel limiter.

BACKGROUND

The statements in this section merely provide background information related to the present disclosure and may not constitute prior art.

Hydraulic bushings typically used in automobile suspensions are expected to damp low frequency, large displacement, oscillations as well as contribute to high frequency acoustic isolation from relatively small displacements. Hydraulic bushings typically have two hydraulic chambers connected by a channel. The resonance of the fluid in the channel creates a mass damper effect. A compliant travel limiter is utilized in some designs to improve the durability of the bushing by transferring high loads from an inner tube to an outer tube through the travel limiter instead of the elastomeric bushing.

Challenges arise regarding packaging a compliant travel limiter into a hydraulic bushing application that has high load carrying capabilities. Traditionally, compliant travel limiter construction includes chemically bonding a rubber pad to inner components that will transfer the load to an outer component. Durability may be a concern due to limited abrasion resistance of the rubber pad as the pad is required to account for combination loading (e.g. torsional angle with a radial load). Known travel limiter designs may tend to create high tensile stresses on the surface which may increase the likelihood of tears in the travel limiter.

SUMMARY

A hydraulic bushing assembly comprises an inner tube including an outer surface, an outer tube circumscribing the inner tube, a travel limiter spaced apart from and surrounding the inner tube, and an elastomeric bushing bonded to the outer surface of the inner tube and at least partially encapsulating the travel limiter. A portion of the elastomeric bushing is positioned between the travel limiter and the outer surface of the inner tube. The portion of the elastomeric bushing is compressible to allow relative movement between the inner tube and the travel limiter. A bump stop is positioned within the outer tube and spaced apart from the travel limiter when in an unloaded state. The travel limiter is operable to move into contact with the bump stop when in a loaded state. A fluid passageway defined by the elastomeric bushing and the outer tube fluidly interconnects first and second fluid chambers. Movement of the inner tube relative to the outer tube causes fluid transfer between the first fluid chamber and the second fluid chamber.

In another arrangement, a hydraulic bushing assembly comprises an inner tube, a travel limiter surrounding the inner tube, a first intermediate insert, a second intermediate insert spaced apart from the first intermediate insert, and an elastomeric bushing disposed around the inner tube and encapsulating the first intermediate insert and the second intermediate insert. The elastomeric bushing at least partially encapsulates the travel limiter such that a portion of the elastomeric bushing is positioned between the travel limiter and the inner tube. First and second bump stops limit displacement of the travel limiter and define first and second fluid chamber within the elastomeric bushing. A fluid passageway defined by an outer tube and the elastomeric bushing extends between the first and second fluid chambers, wherein relative movement between the inner tube and the outer tube causes fluid transfer between the first fluid chamber and the second fluid chamber.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
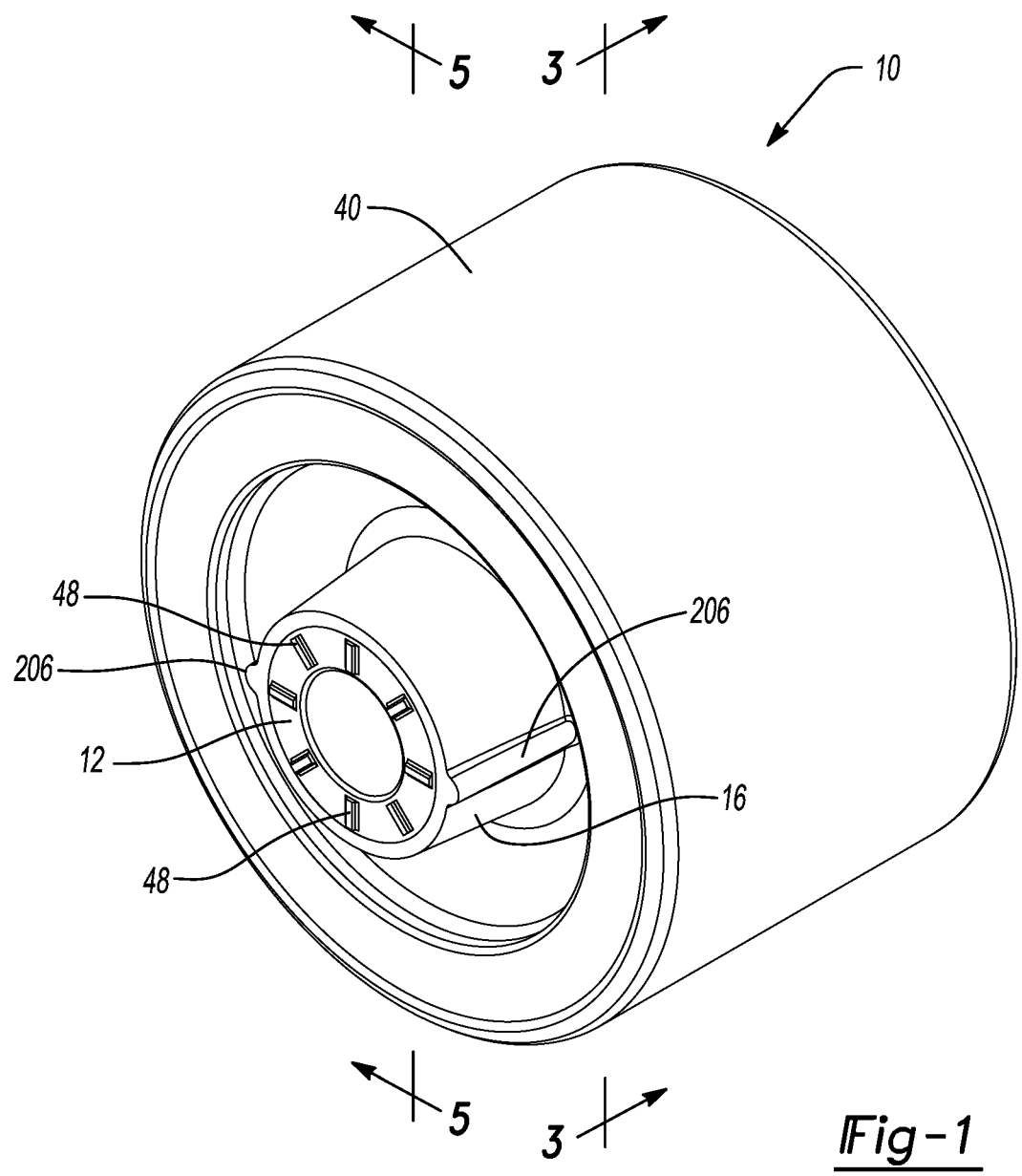
FIG. 1 is a perspective view of a hydraulic bushing assembly in accordance with one embodiment of the present disclosure.
Figure 2:
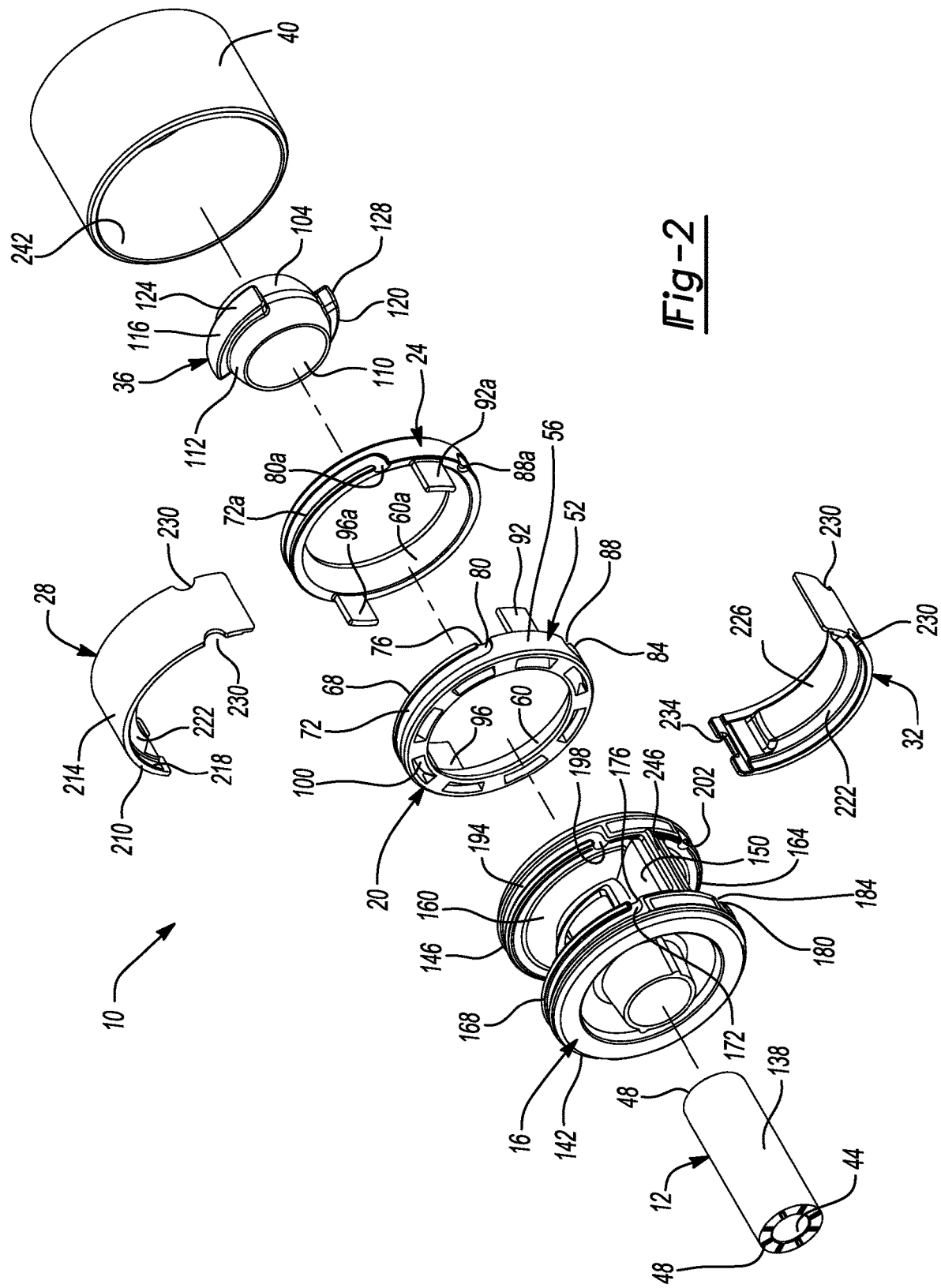
FIG. 2 is a cross-sectional view of the hydraulic bushing assembly illustrated in FIG. 1.
Figure 3:
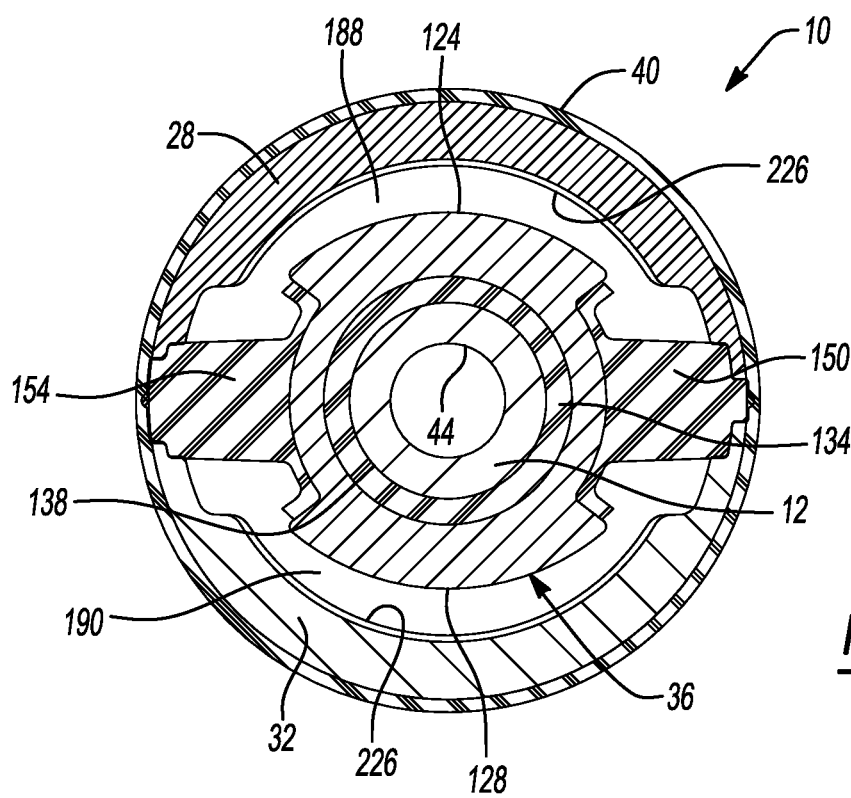
FIG. 3 is a cross-sectional view of the hydraulic bushing assembly illustrated in FIG. 1.
Figure 4:
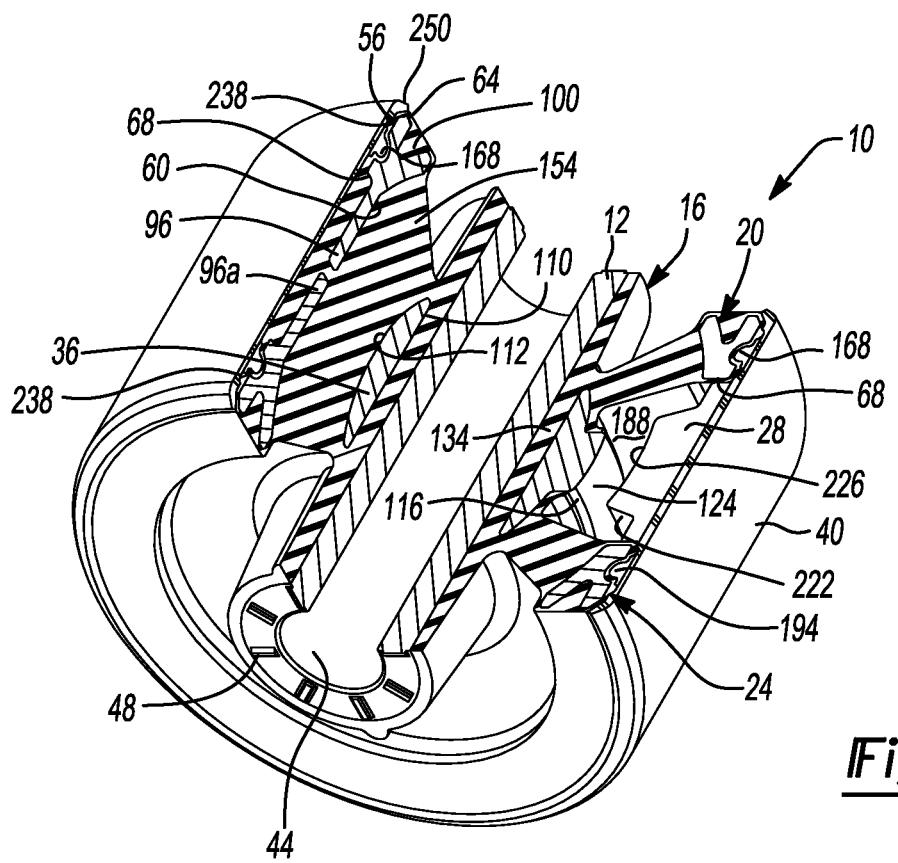
FIG. 4 is a fragmentary perspective view of the hydraulic bushing assembly illustrated in FIG. 1.

Example embodiments will now be described more fully with reference to the accompanying drawings.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-6 illustrate a hydraulic bushing assembly which is designated generally by reference numeral 10. Hydraulic bushing assembly 10 comprises an inner tube 12, an elastomeric bushing 16, a first intermediate insert 20, a second intermediate insert 24, a first bump stop 28, a second bump stop 32, a travel limiter 36, and an outer tube 40.

Inner tube 12 is a metallic member preferably constructed from mild steel such as SAE J403 1008-1010. Inner tube 12 includes a through bore 44 for receipt of a fastener (not shown) to interconnect hydraulic bushing assembly 10 to a vehicle component such as a suspension control arm. A plurality of circumferentially spaced apart castellations 48 extend from either end of inner tube 12. Castellations 48 may cooperate with an adjacent member to which hydraulic bushing assembly 10 is coupled to assist in alignment and maintaining rotational position of inner tube 12. As some portions of inner tube 12 may be exposed to the environment, the exterior surfaces of inner tube 12 may be treated with a Zn—Ni plating.

First intermediate insert 20 and second intermediate insert 24 are identical to one another. As such, only first intermediate insert 20 will be described in detail. Similar features on second intermediate insert 24 will be identified with an "a" suffix. First intermediate insert 20 includes a ring shaped body 52 having an outer cylindrical surface 56, an inner surface 60, an outer end face 64 and an inner end face 68. Both first intermediate insert 20 and second intermediate insert 24 are constructed from a plastic material such as nylon PA6 that may be reinforced and designated as 35% glass filled.

A channel 72 circumferentially extends along outer cylindrical surface 56 for a majority of the circumferential extent of body 52. Channel 72 includes a first axially extending portion 76 that extends to inner end face 68 to define a first port 80. Channel 72 includes a second axially extending portion 84 that extends to inner end face 68 to define a second port 88. A pair of diametrically opposed tabs 92, 96 axially extend from inner end face 68. A plurality of recesses 100 axially extend into body 52 from outer end face 64. As will be described in greater detail, each of first intermediate insert 20 and second intermediate insert 24 are entirely encapsulated within elastomeric bushing 16. Molten elastomeric material fills recesses 100 during the over-molding process to enhance the structural interconnection and maintain the desired relative position between the other over molded components and the elastomeric bushing 16.

Second intermediate insert 24 is positioned in an opposed mirror orientation to first intermediate insert 20 such that tabs 92 and 92a are axially aligned with one another. Tabs 96 and 96a are also axially aligned with one another.

Travel limiter 36 includes a body 104 with a cylindrically shaped through bore defined by an inner surface 110. An outer surface 112 is substantially spherically shaped. A pair of diametrically opposed protrusions 116, 120 radially outwardly extend from outer surface 112. Each protrusion 116, 120 includes a spherically shaped contact surface 124, 128, respectively. Travel limiter 36 may be formed from a plastic material similar to or different from the material used to construct first intermediate insert 20 and second intermediate insert 24. In the instant example, travel limiter 36 is also constructed from a 35% glass-filed nylon PA6.

In an exemplary method of manufacturing hydraulic bushing assembly 10, each of inner tube 12, first intermediate insert 20, second intermediate insert 24 and travel limiter 36 are placed into an injection mold in a spaced apart relationship. Liquid elastomer is injected into the mold to bond each of the previously listed components to one another. Once solidified, elastomeric bushing 16 includes a cylindrically shaped inner portion 134 bonded to an external surface 138 of inner tube. Inner portion 134 is also bonded to inner surface 110 of travel limiter 36 to provide an elastomeric cushion between travel limiter 36 and inner tube 12 such that relative movement between travel limiter 36 and inner tube 12 may occur during high load conditions.

Elastomeric bushing 16 further includes a first flange 142 and a second flange 146 integrally formed with and radially outwardly extending from inner portion 134. A first web 150 and a second web 154 longitudinally extend to interconnect first flange 142 with second flange 146. Each of first web 150 and second web 154 radially outwardly extend from inner portion 134. First flange 142, second flange 146, inner portion 134 and first and second webs 150, 154 cooperate with one another to define a first cavity 160 and a diametrically opposed second cavity 164.

First flange 142 includes a circumferentially extending channel 168 that extends for a majority of the circumferential extent of first flange 142. Channel 168 includes a first axially extending portion 172 that defines a first port 176 in communication with first cavity 160. Channel 168 includes a second axially extending portion 180 that defines a port 184 in fluid communication with second cavity 164. When hydraulic bushing assembly 10 is completely assembled, first cavity 160 and second cavity 164 in cooperation with first bump stop 28 and second bump stop 32 define a first fluid chamber 188 and a second fluid chamber 190.

Second flange 146 is substantially the mirror image of first flange 142 and includes a channel 194. Channel 194 circumferentially extends to define a third port 198 in fluid communication with first chamber 188 and a fourth port 202 include fluid communication with second fluid chamber 190. Channel 168 provides fluid communication between first chamber 188 and second chamber 190 via first port 176 and second port 184. Based on the fluid paths described and the non-rigid nature of elastomeric bushing 16, fluid flow occurs between first chamber 188 and second chamber 190 during relative movement between inner tube 12 and outer tube 40. The flow of fluid between fluid chambers 188, 190 through channels 168, 194 creates a mass-damper effect within hydraulic bushing assembly 10.

As best shown in FIG. 1, elastomeric bushing 16 may further include radially outwardly extending ribs 206. Ribs 206 are diametrically opposed and positioned at an angular orientation associated with the rotational position of first and second webs 150, 154. Ribs 206 offer a visual indication of the position of the components within hydraulic bushing assembly 10 after the component has been completely constructed. Ribs 206 may cooperate with mating features in an adjacent vehicle component to properly align travel limiter 36 in relation to the direction of expected maximum loading.

Figure 5:
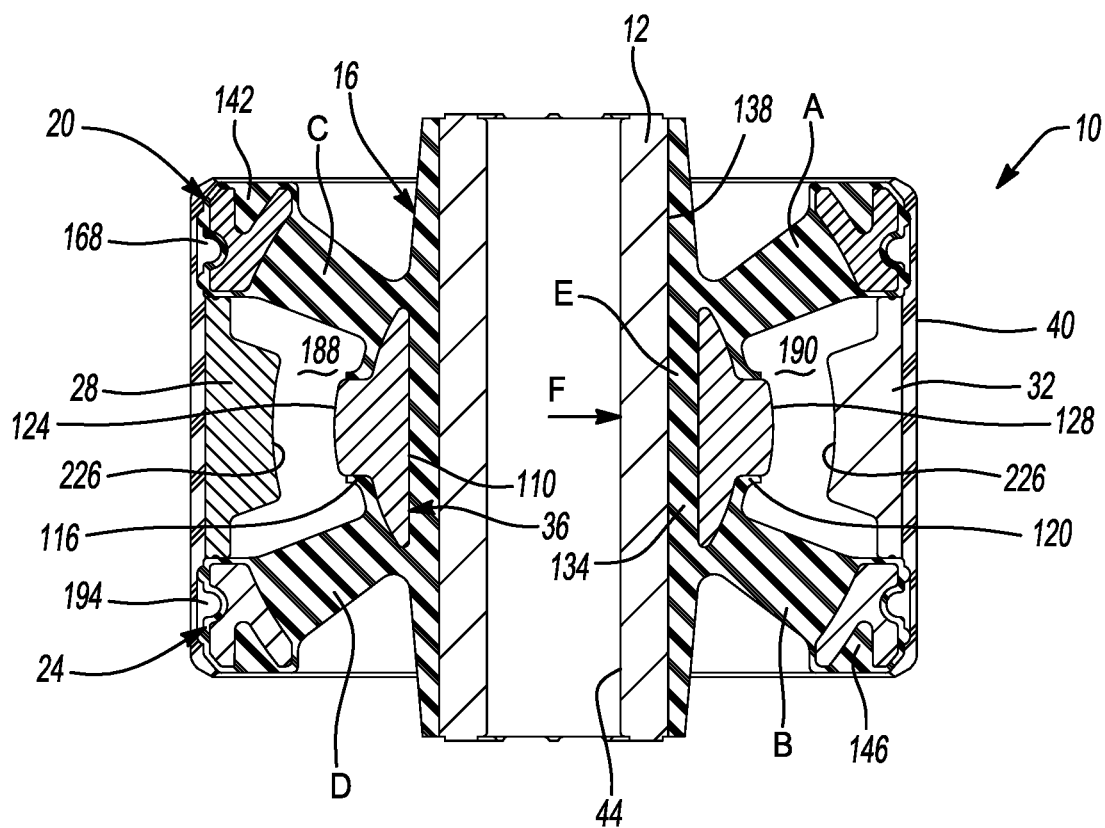
FIG. 5 is a cross-sectional view of the hydraulic bushing assembly illustrated in FIG. 1.
Figure 6:
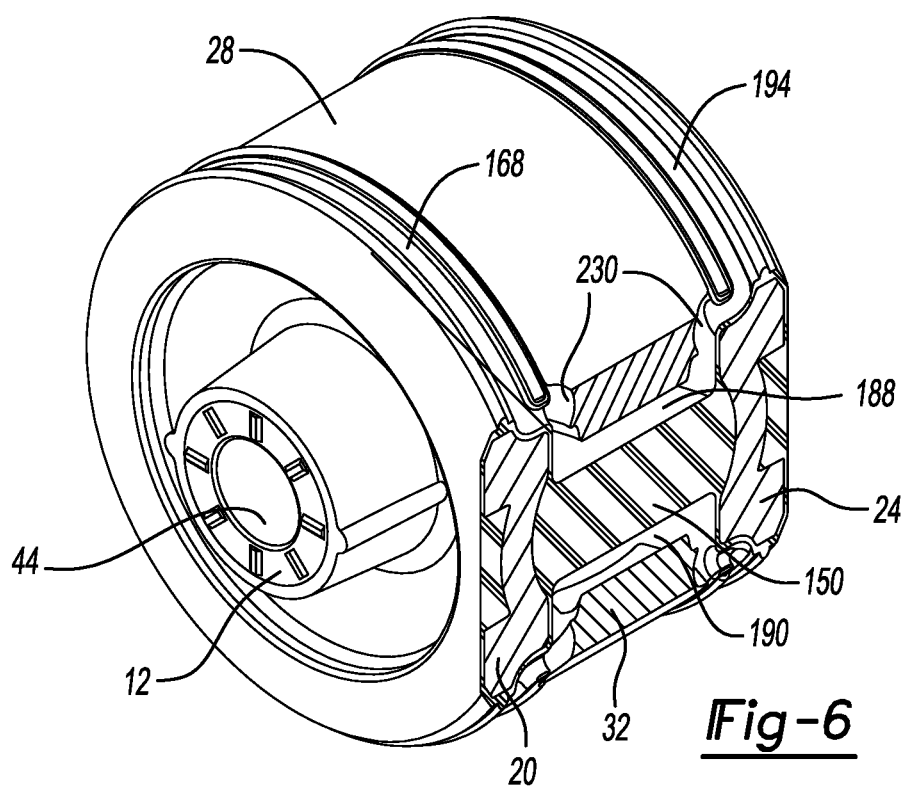
FIG. 6 is a fragmentary perspective view of the hydraulic bushing assembly illustrated in FIG. 1.

First bump stop 28 and second bump stop 32 are substantially similar to one another, if not identical. Accordingly, only first bump stop 28 will be described in detail. Similar elements will be identified with the same reference numerals. First bump stop 28 is substantially semicircular in shape having a curved wall 210 with an outer surface 214 and an inner surface 218. A protrusion 222 radially inwardly extends from inner surface 218. A spherically-shaped stop face 226 circumferentially extends along the inner radially extent of protrusion 222. As best depicted in FIG. 5, contact surfaces 124, 128 of travel limiter 36 are radially spaced apart stop faces 226. The figures depict travel limiter 36 partially embedded within elastomeric bushing 16 but not entirely encapsulated therein. The elastomeric material does not cover the distal ends of protrusions 116, 120. This condition allows direct contact between spherical surfaces 124, 128 and stop faces 226 during high load conditions. It should be appreciated that while this exposed surface configuration may be preferable, it also contemplated that travel limiter 36 is entirely encapsulated within elastomeric bushing 16. In this configuration, a relatively thin thickness of elastomeric bushing 16 is positioned radially outward of protrusions 116, 120.

Each of first bump stop 28 and second bump stop 32 includes scallops 230 through which fluid flows during a fluid transfer between first fluid chamber 188 and second fluid chamber 190. A groove 234 is formed at one end of each first and second bump stop 28, 32 for engagement with a respective portion of elastomeric bushing 16 to properly aligned the first and second bump stops 28, 32 within first cavity 160 and second cavity 164, respectively.

Elastomeric bushing 16 includes a plurality of beads 238 circumferentially extending about its outer surface shaped and sized to sealingly engage in inner surface 242 of outer tube 40 and fully define the fluid passageways comprising channels 168, 194. Axially extending beads 246 radially outwardly protrude from first web 150 and second web 154 to sealing engage inner surface 242 of outer tube 40 and define fluid chambers 188, 190.

Prior to positioning outer tube over elastomeric bushing 16, all components are submersed in fluid. Once submersed, first bump stop 28 is positioned within first cavity 160 and second bump stop 32 is positioned within second cavity 164 to define and fill chambers 188, 190 with fluid. Next, outer tube 40 is axially translated over and in pressed engagement with elastomeric bushing 16 and the bump stops 28, 32. Distal ends 250 of outer tube 40 are mechanically curled or otherwise deflected to maintain a desired relative axial position of outer tube 40 relative to elastomeric bushing 16. Chambers 188, 190 may be filled with any suitable liquid such as water or glycol.

Of particular advantage, elastomeric bushing 16 includes some portions that are positioned radially inwardly of travel limiter 36 and other portions positioned radially outward from travel limiter 36. FIG. 5 provides a cross-sectional view depicting both protrusions 116, 120 spaced apart from respective first bump stop 28 and second bump stop 32 when hydraulic bushing assembly 10 is an unload condition. When installed in an operating vehicle, a force F may be applied to inner tube 12 such that inner tube 12 and protrusion 120 are displaced toward the right as viewed in FIG. 5 until spherical surface 128 contacts stop face 226. At this time, a portion A of first flange 142 and a portion B of second flange 146 are placed in compression. As would follow, a portion C of first flange 142, opposite portion A, is in tension. A portion D of second flange 146 on the same side of inner tube 12 as portion C is also in tension. A volume E of inner portion 134 is also placed in compression. At this time, travel limiter 36 may no longer be displaced toward bump stop 32.

Additional relative movement between inner tube 12 and outer tube 40 is provided by the compressibility of inner portion 134. Because travel limiter 36 ceases to move, any strain acting on portion C and D will not increase or only minimally increase during the last phase of movement of inner tube 12 relative to outer tube 40 while travel limiter 36 engages one of the bump stops 28, 32. The disclosed hydraulic bushing assembly 10 provides an advantage over earlier designs that would not limit the tensile stress in portions C and D as previously described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hydraulic bushing assembly comprising:
an inner tube including an outer surface;
an outer tube circumscribing the inner tube;
a travel limiter spaced apart from and surrounding the inner tube;
an elastomeric bushing bonded to the outer surface of the inner tube and at least partially encapsulating the travel limiter, wherein a portion of the elastomeric bushing is positioned between the travel limiter and the outer surface of the inner tube, the portion of the elastomeric bushing being compressible to allow relative movement between the inner tube and the travel limiter,
a bump stop positioned within the outer tube and spaced apart from the travel limiter when in an unloaded state, wherein the travel limiter is operable to move into contact with the bump stop when in a loaded state;

first and second fluid chambers;

a fluid passageway between the elastomeric bushing and the outer tube, the fluid passageway extending between the first and second fluid chambers, wherein movement of the inner tube relative to the outer tube causes fluid transfer between the first fluid chamber and the second fluid chamber; and a first intermediate insert and a second intermediate insert spaced apart from the first intermediate insert, the elastomeric bushing encapsulating the first intermediate insert and the second intermediate insert, wherein the first intermediate insert includes a groove defining a path of the fluid passageway.

2. The hydraulic bushing assembly according to claim 1, wherein the travel limiter includes a protrusion with a distal surface.

3. The hydraulic bushing assembly according to claim 2, wherein the bump stop includes a stop face selectively engageable with the travel limiter distal surface.

4. The hydraulic bushing assembly according to claim 3, wherein the stop face and the travel limiter distal surface are spherically shaped.

5. The hydraulic bushing assembly according to claim 2, wherein the inner tube extends along a longitudinal axis and the protrusion radially extends within one of the fluid chambers.

6. The hydraulic bushing assembly according to claim 3, wherein the stop face is positioned in constant contact with fluid within one of the first fluid chamber and the second fluid chamber.

7. The hydraulic bushing assembly according to claim 1, wherein the inner tube and the outer tube are coaxially aligned when in an unloaded condition.

8. The hydraulic bushing assembly according to claim 1, wherein the outer tube includes at least one curled end.

9. The hydraulic bushing assembly according to claim 1, wherein the elastomeric bushing includes axially spaced apart flanges interconnected by axially extending webs, wherein each web is a portion of each of the first and second fluid chambers.

10. A hydraulic bushing assembly comprising:

an inner tube;

a travel limiter surrounding the inner tube;

a first intermediate insert;

a second intermediate insert spaced apart from the first intermediate insert;

an elastomeric bushing disposed around the inner tube and encapsulating the first intermediate insert and the second intermediate insert, the elastomeric bushing at least partially encapsulating the travel limiter such that a portion of the elastomeric bushing is positioned between the travel limiter and the inner tube to allow relative movement therebetween, the elastomeric bushing defining first and second cavities;

a first bump stop spaced apart from the travel limiter and positioned in the first cavity to define a first fluid chamber and limit displacement of the travel limiter;

a second bump stop spaced apart from the first bump stop and the travel limiter and positioned in the second cavity to define a second fluid chamber and limit displacement of the travel limiter;

an outer tube circumscribing the elastomeric bushing; and a fluid passageway defined by the elastomeric bushing and the outer tube, the fluid passageway extending between the first and second fluid chambers, wherein movement of the inner tube relative to the outer tube causes fluid transfer between the first fluid chamber and the second fluid chamber wherein the elastomeric bushing includes axially spaced apart flanges interconnected by first and second axially extending webs, wherein each web is a portion of each of the first and second fluid chambers, wherein the first bump stop includes a first end sealing engaged with the first web and a second end sealing engaged with the second web, the second bump stop including a first end sealing engaged with first web and a second end sealing engaged with the second web.

11. The hydraulic bushing assembly according to claim 10, wherein the travel limiter includes a pair of diametrically opposed protrusions each including a distal surface.

12. The hydraulic bushing assembly according to claim 11, wherein each of the first bump stop and the second bump stop includes a spherically shaped stop face selectively engageable with one of the travel limiter distal surfaces.

13. The hydraulic bushing assembly according to claim 12, wherein the travel limiter distal surfaces are spherically shaped.

14. The hydraulic bushing assembly according to claim 10, wherein the outer tube includes at least one curled end.

15. The hydraulic bushing assembly according to claim 10, wherein the inner tube is radially moveable relative to the travel limiter.

16. The hydraulic bushing assembly according to claim 10, wherein the first intermediate insert and the second intermediate insert are identical.

17. The hydraulic bushing assembly according to claim 10, wherein the elastomeric bushing is bonded to and interconnects each of the inner tube, the first intermediate insert, the second intermediate insert, and the travel limiter.

18. The hydraulic bushing assembly according to claim 10, wherein each of the flanges includes a circumferentially extending channel interconnecting the first and second fluid chambers.

* * * * *